United States Patent

Wiesheu et al.

[11] Patent Number: 5,984,986
[45] Date of Patent: Nov. 16, 1999

[54] PROCESS FOR OPERATING A SYSTEM FOR THE WATER VAPOR REFORMING OF METHANOL

[75] Inventors: Norbert Wiesheu, Guenzburg; Christian Duelk, Ulm; Rainer Autenrieth, Erbach; Uwe Benz, Uhldingen, all of Germany

[73] Assignee: DaimlerChrysler AG, Germany

[21] Appl. No.: 08/876,532

[22] Filed: Jun. 16, 1997

[30] Foreign Application Priority Data

Jun. 15, 1996 [DE] Germany .................. 196 23 919

[51] Int. Cl.⁶ .................. H01M 8/06; C01B 3/32
[52] U.S. Cl. .................. 48/203; 48/197 R; 429/13; 429/17; 252/373; 423/648.1; 423/418.2
[58] Field of Search .................. 429/13, 17, 19, 429/24, 22, 20, 12, 50, 44; 60/286; 203/3, DIG. 18; 159/44; 568/913; 48/203, 198.8, 199 FM, 197 R; 252/373; 423/648.1, 418.2

[56] References Cited

U.S. PATENT DOCUMENTS

| | | | |
|---|---|---|---|
| 3,585,078 | 6/1971 | Sederquist et al. | 429/17 |
| 5,401,589 | 3/1995 | Palmer et al. | 429/13 |
| 5,658,681 | 8/1997 | Sato et al. | 429/13 |
| 5,712,052 | 1/1998 | Kawatsu | 429/13 |
| 5,766,786 | 6/1998 | Fleck et al. | 429/17 |

FOREIGN PATENT DOCUMENTS

| | | |
|---|---|---|
| 0 710 835A2 | 5/1995 | European Pat. Off. . |
| 0 813 262A2 | 12/1997 | European Pat. Off. . |
| 0 813 263A2 | 12/1997 | European Pat. Off. . |
| 1949184 | 5/1970 | Germany . |
| 2157722 | 7/1972 | Germany . |
| 25 12 363A1 | 9/1976 | Germany . |
| 58-018881 | 2/1983 | Japan . |
| 62-46902 | 2/1987 | Japan . |
| 07320763 | 12/1995 | Japan . |

*Primary Examiner*—Hien Tran
*Attorney, Agent, or Firm*—Evenson, McKeown, Edwards & Lenahan, P.L.L.C.

[57] ABSTRACT

The invention provides a process for operating a system for water vapor reforming of methanol in which, in a mixture preparation step, a water vapor/methanol mixture is prepared from water and methanol and is introduced into a reforming reactor. According to the invention, the mixing ratio of the water vapor/methanol mixture is adjusted as a function of the load condition and/or load changes of the system so that a CO-concentration is obtained in the reformate which remains constant over the whole load range.

3 Claims, 2 Drawing Sheets

PROCESS FOR OPERATING A SYSTEM FOR THE WATER VAPOR REFORMING OF METHANOL

This application claims the priority of German patent application 196 23 919.2, the disclosure of which is expressly incorporated by reference herein.

BACKGROUND AND SUMMARY OF THE INVENTION

The invention relates to a process and apparatus for operating a system for water vapor reforming of methanol.

For operating such systems, it is known to vary the amount of the processed water vapor/methanol mixture which is introduced into the reforming reactor as a function of the load condition and the load change of the system. In German Patent Documents DE 1 949 184 and DE 21 57 722 C2 (in which methane is used instead of methanol), for example, a jet pump is provided for this purpose, and the vapor flow is adjusted as a function of the loading condition of the system. Thus, during a load change, the methane inflow also changes corresponding to the jet pump characteristics.

U.S. Pat. No. 5,401,589 discloses a process for operating a fuel cell system in a motor vehicle by means of a reformer system which is connected in front of the fuel cells and uses water vapor reforming of methanol for the purpose of obtaining the hydrogen required for the fuel cells. In order to be able to react to load changes faster than by merely changing the amount of the water vapor/methanol mixture introduced into the reforming reactor, a buffer battery and an oxygen reservoir are provided. In the case of an increased load requirement, additional oxygen is taken from the oxygen reservoir for introduction into the fuel cell system. It is also known from this as well as other documents that, when the water vapor concentration in the water vapor/methanol gas mixture is too low, during its reforming an increased CO-concentration occurs in the reformate. This is undesirable, particularly when the reformate is used as a fuel in so-called PEM fuel cells because these are poisoned by carbon monoxide. Normally, the water vapor/methanol mixing ratio is therefore maintained within a range of between one and ten.

During the operation of systems for the water vapor reforming of methanol, it is observed that in the case of a load change (that is, a change of the quantity of water vapor/methanol mixture introduced into the reforming reactor), a change of the water vapor/methanol mixture ratio occurs, due to a momentary change of the evaporation conditions in the system. This, in turn, leads to fluctuations in the CO-concentration of the reformate, which can cause undesirably high CO-concentrations at times, which must be removed in a purification process which follows.

The object of the invention is to provide a process of the initially mentioned type which avoids an occurrence of undesirable CO-concentrations in the reformate, during dynamic load changes as well as in static operation.

This and other objects and advantages are achieved by the process according to the invention, in which the water vapor/methanol mixing ratio of the water vapor/methanol mixture prepared in the mixture preparation step and introduced into the reforming reactor, is adjusted as a function of the time variation of the load condition, so that a CO-concentration is obtained in the reformate which is constant over the whole load range. As required, such adjustment of the water vapor/methanol mixing ratio can take place by a pure control, without an absolute requirement of feedback regulation. Keeping the CO-concentration constant in the reformate prevents undesirable CO peak values and permits a simple design of a gas purification step optionally connected behind the reforming reactor, which removes undesirable carbon monoxide. The process therefore advantageously adapts the method of operation to the loading of the system, avoiding increased CO-concentrations in the reformate.

Other objects, advantages and novel features of the present invention will become apparent from the following detailed description of the invention when considered in conjunction with the accompanying drawings.

DETAILED DESCRIPTION OF THE DRAWINGS

Figure 1:
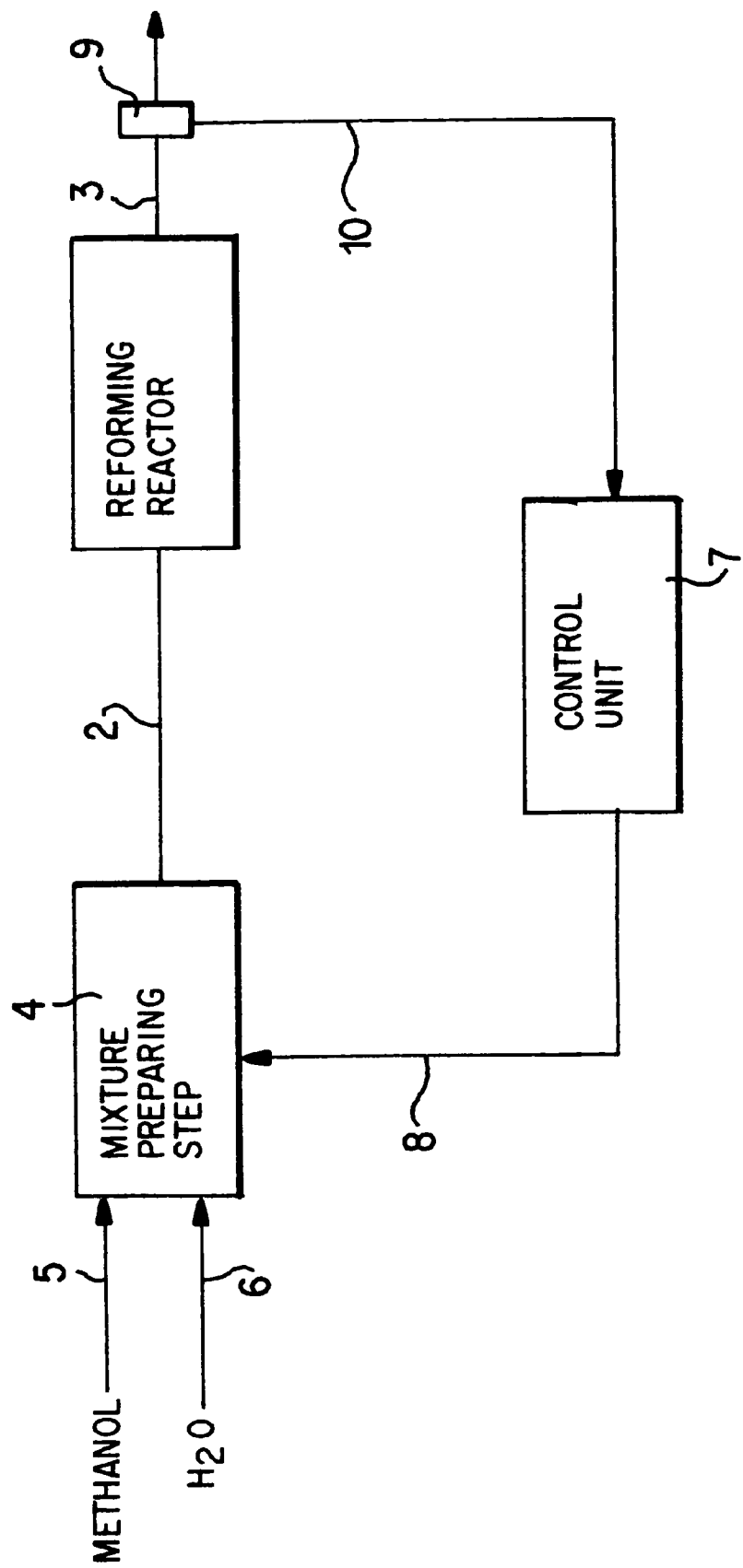
FIG. 1 is a block diagram of a system for the water vapor reforming of methanol according to the invention.

The system for the water vapor reforming of methanol illustrated in FIG. 1 includes the relevant components for use, for example, in a fuel-cell-operated motor vehicle, to provide hydrogen as a fuel for fuel cells. A reforming reactor 1 receives as an input a water vapor/methanol mixture 2, and produces and delivers a reformate 3 which contains the desired hydrogen, as well as an undesirable portion of carbon monoxide. Since carbon monoxide can effectively poison, for example, a PEM fuel cell arrangement, it is converted into carbon dioxide or separated from the hydrogen in a step which follows the reforming reactor 1 and is not shown.

The water vapor/methanol mixture 2 introduced into the reforming reactor 1 is prepared in a mixture preparation step 4. For this purpose, methanol is supplied by way of a methanol feeding pipe 5, and water is supplied, by way of a water feeding pipe 6. (The liquid constituents can be mixed first and then evaporated or superheated together. Alternatively, the two constituents can first be evaporated separately and then mixed.) The operation of the system is carried out by a control or regulating unit 7. The reforming reactor 1, the mixture preparation step 4 and the control or regulating unit 7 may be implemented using conventional components well known to those skilled in the art, and therefore do not require additional explanation here.

The control or regulating unit 7 receives load information (for example, from a sensor 9) by way of a measuring line 10. (In this embodiment, the sensor 9 determines the load, for example, by detecting the quantity of the water vapor/methanol consumed in the reforming reactor.) As a function of this load information, the control or regulating unit 7 controls the components of the mixture preparation step 4 by way of a set of control lines 8, in a manner explained below.

Figure 2:
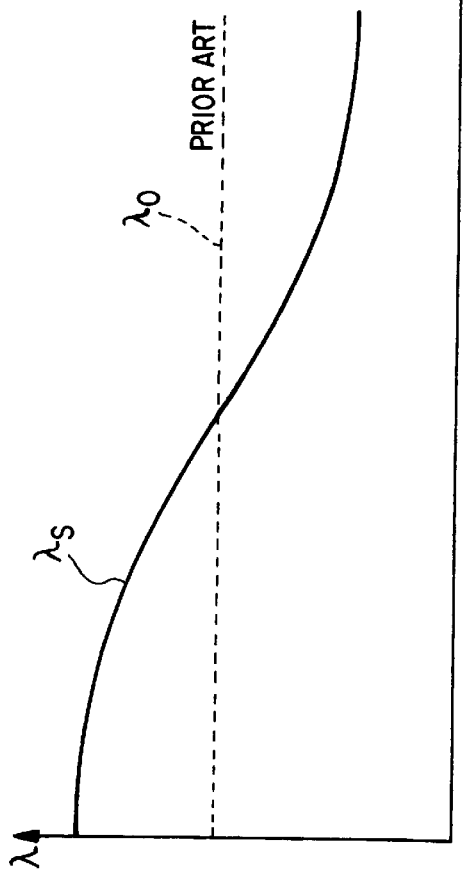
FIG. 2 is a graphic illustration of the dependence of the water vapor/methanol mixing ratio on the system load.
Figure 3:
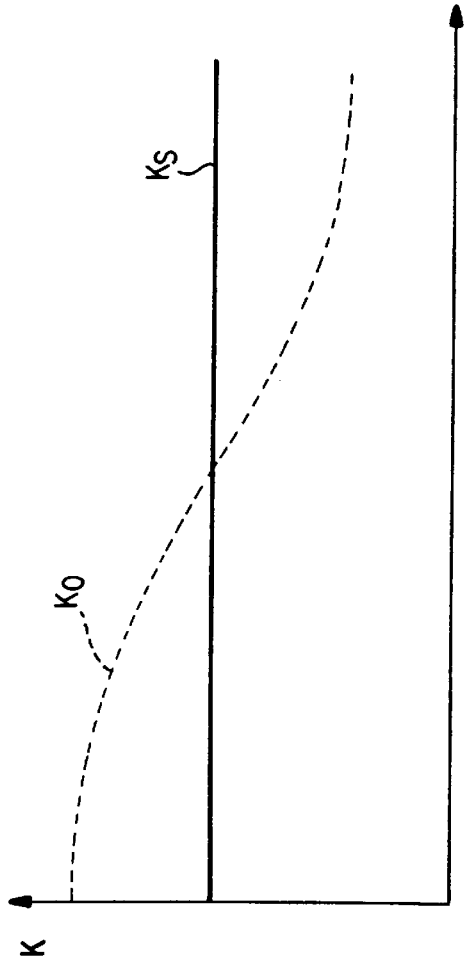
FIG. 3 is a graphic illustration of the dependence of the CO-concentration in the reformate on the system load.

In the mixture preparation step 4 the quantity of the prepared water vapor/methanol mixture is increased or decreased with a rising or falling load, in a conventional manner. Without additional measures, this would mean that independently of the respective loading of the system, apart from possible short-term fluctuations, a constant water vapor/methanol mixing ratio would be maintained. In the diagram of FIG. 2, which shows water vapor/methanol mixing ratio ($\lambda$) as a function of the loading (B) of the system, this condition is represented by the horizontal straight line characteristic mixing ratio curve ($\lambda_o$) indicated by a broken line. For this conventional method of operation, a course of the CO-concentration in the reformate is observed which does not remain constant, as illustrated in the diagram of FIG. 3, showing CO-concentration (K) in the reformate as a function of the loading (B). This variable course is represented by the characteristic concentration curve ($K_o$) indicated by a broken line. Such variation of the CO-concentration ($K_o$) as a function of the loading (B) makes subsequent conversion of the carbon monoxide into carbon dioxide difficult. Also, in the range of a low loading of the system, it results in comparatively high CO-concentrations in the reformate.

The method of operation of the system according to the invention resolves this difficulty. For this purpose, a desired characteristic curve ($\lambda_s$) for the water vapor/methanol mixing ratio is predetermined as a function of the loading (B) of the system, and is stored in the control or regulating unit 7. This characteristic mixing ratio curve ($\lambda_s$) is selected such that, when the desired value is maintained over the whole load range of the system, a constant course ($K_s$) of the CO-concentration in the reformate is obtained, as illustrated in FIG. 3 by the straight horizontal line of the characteristic curve. The CO-concentration in the reformate thus remains constant, and is independent of a changing system load, thereby facilitating a subsequent CO-oxidation and permitting a simple construction of a CO-oxidizer for this purpose. In addition, in comparison to the conventional method of operation without a load-dependent change of the water vapor/methanol mixing ratio, in the range of low loads noticeably lower CO-concentrations are achieved in the reformate 3.

On the whole, in this manner, while the system design is relatively simple, a high efficiency can be achieved for obtaining hydrogen by water vapor reforming of methanol. The fact that the water vapor/methanol mixing ratio, as described, is adjusted by means of a pure control to the value in each case required for maintaining the CO-concentration in the reformate constant, without necessity of a regulating, also contributes to the simplicity of the system. However, it is understood that a regulating arrangement can also be used to keep the CO-concentration constant, by changing the water vapor/methanol mixing ratio by means of suitable adjusting signals for the components of the mixture preparation step 4, as a function of the difference between a predetermined desired constant CO-concentration value and the actual value of the CO-concentration in the reformate 3 measured by a sensor system which is to be provided correspondingly. (In the latter embodiment, for example, the sensor 9 may detect CO concentration in the output 3 of the reformer 1, and the control or regulating unit 7 determines the deviation from the desired CO concentration value, and feeds back a signal which appropriately adjusts the water vapor/methanol mixture.) In either case, according to the invention, the respective desired value of the water vapor/methanol mixing ratio is adapted to the momentary loading of the system, and in this manner the method of operation of the system is adjusted such that the CO-concentration in the reformate remains constant at the output of the reforming reactor.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for operating a system for water vapor reforming of methanol, comprising:

preparing a water vapor/methanol mixture from water and methanol in a mixture preparation step;

introducing the prepared water vapor/methanol mixture into a reforming reactor in a quantity depending on an output requirement of the system; and adjusting the water vapor/methanol mixing ratio of the water vapor/methanol mixture, as a function of at least one of a load condition and load changes of the system such that a CO-concentration is obtained in reformate output from the system, which CO-concentration remains constant over a load range in which the system operates.

2. Process for operating a system for water vapor reforming of methanol, comprising:

preparing a water vapor/methanol mixture from water and methanol in a mixing step;

introducing said water vapor/methanol mixture into a reforming reactor for reforming said methanol;

detecting at least one of a load condition and load changes of said reforming reactor;

providing a preselected characteristic for a water vapor/methanol mixing ratio as a function of load condition of said reforming reactor, wherein said water vapor/methanol mixing ratio varies with said load condition such that CO concentration in a reformate generated by said reforming reactor is constant over an entire load range of said reforming reactor; and adjusting a mixing ratio of said water vapor/methanol mixture as a function of at least one of detected load condition and load changes of said reforming reactor, according to said preselected characteristic.

3. Process for operating a system for water vapor reforming of methanol according to claim 2 wherein said detecting step comprises detecting a quantity of said water vapor/methanol mixture introduced into said reforming reactor.

* * * * *